No. 879,701. PATENTED FEB. 18, 1908.
O. VAN TASSELL.
GATE.
APPLICATION FILED OCT. 18, 1907.
2 SHEETS—SHEET 1.
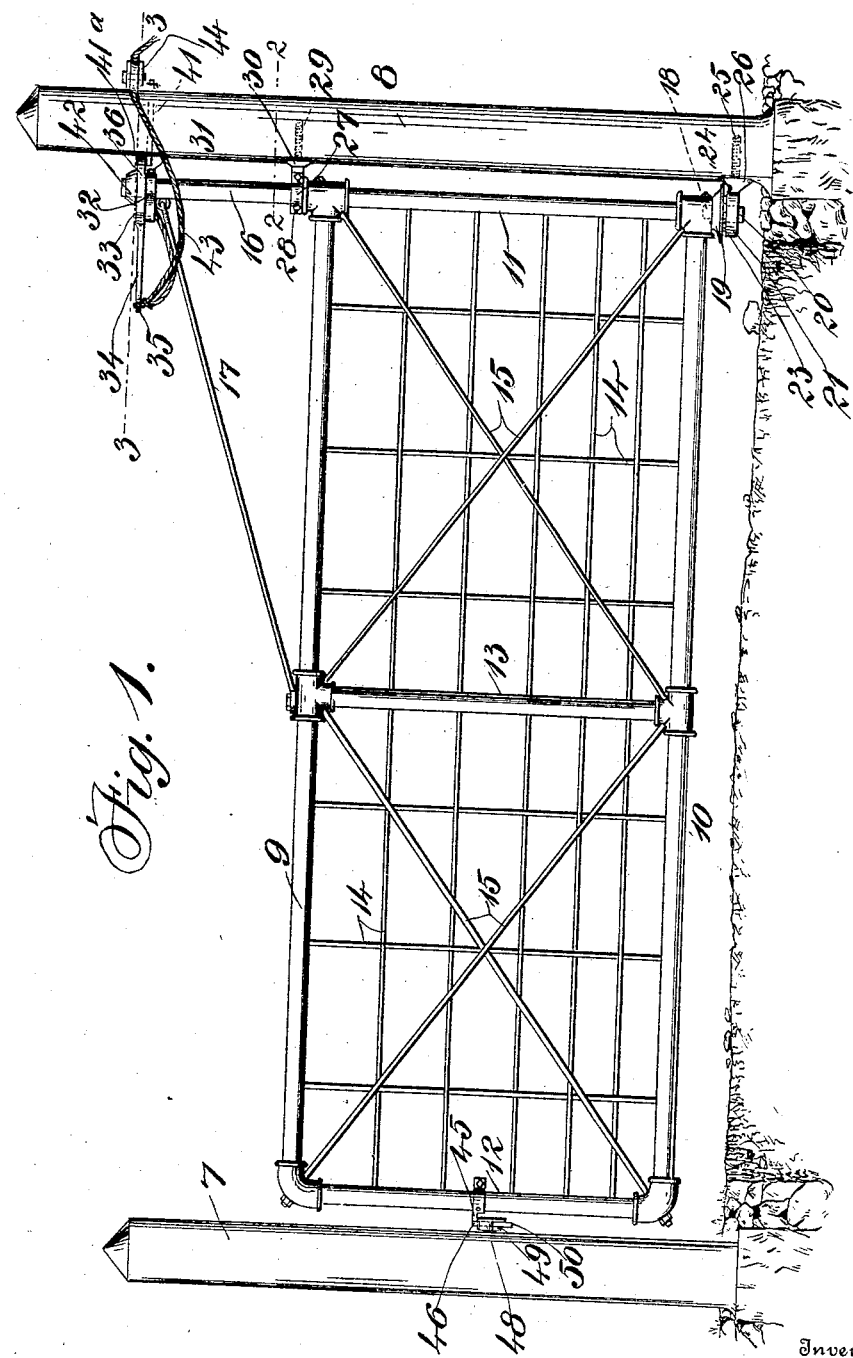

No. 879,701.
PATENTED FEB. 18, 1908.
O. VAN TASSELL.
GATE.
APPLICATION FILED OCT. 18, 1907.
2 SHEETS—SHEET 2.
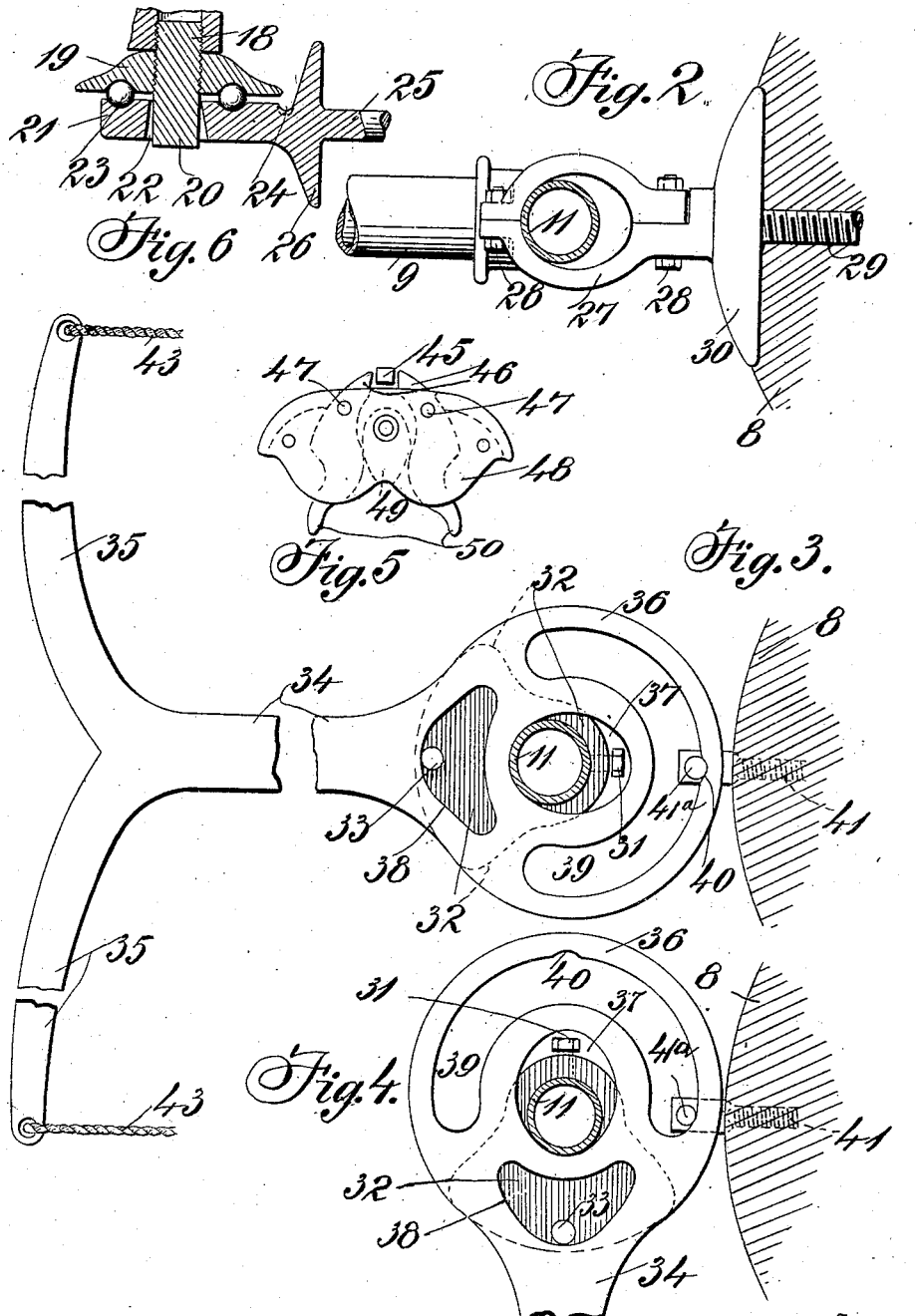

UNITED STATES PATENT OFFICE.

OSCAR VAN TASSELL, OF BOZEMAN, MONTANA.

GATE.

No. 879,701.  Specification of Letters Patent.  Patented Feb. 18, 1908.

Application filed October 18, 1907. Serial No. 398,069.

*To all whom it may concern:*

Be it known that I, OSCAR VAN TASSELL, a citizen of the United States, residing at Bozeman, in the county of Gallatin and State of Montana, have invented certain new and useful Improvements in Gates, of which the following is a specification.

This invention relates to gates and more particularly an operating-mechanism therefor, whereby a self-opening and closing gate is had, and also one which can be opened and closed from a distance by a person mounted or afoot.

The object of the invention is to provide a gate operating-mechanism of this kind which is simple in construction, and efficient in operation.

In the accompanying drawing, Figure 1 is an elevation showing the gate closed. Fig. 2 is a horizontal section on the line 2—2 of Fig. 1. Fig. 3 is a horizontal section on the line 3—3 of Fig. 1. Fig. 4 is a sectional view similar to Fig. 3 showing the gate open. Fig. 5 is an elevation of the latch-keeper used in connection with the gate. Fig. 6 is a sectional detail of the gate-pivot.

In the drawings, the latch-post is indicated at 7 and the hinge-post at 8. The gate comprises horizontal top and bottom bars 9 and 10 respectively, and vertical end bars 11 and 12 respectively, and a vertical intermediate bar 13. These bars are preferably steel tubing joined by suitable couplings, and they are connected by horizontal and vertical rods 14.
The gate also has diagonal braces 15 provided with means for tightening them to take up all sag of the gate, and to hold the parts rigidly together. The hinge-bar of the gate which is the bar 11 extends a distance above the gate as indicated at 16 for a purpose to be hereinafter described, and it is braced by a guy-wire 17 extending to the T which connects the intermediate bar 13 with the top bar 9.

Into the coupling which connects the bottom bar 10 and the hinge-bar 11 is screwed a stem 18, and outside the coupling a collar or flange 19 is screwed on said stem. That portion of the stem below the collar indicated at 20 serves as a pivot for the gate. To the hinge-post 8 is secured a step-bearing for the pivot 20 comprising a plate 21 having a central opening 22 in which the pivot fits loose enough to permit the gate to be tilted toward the hinge-post for a purpose to be hereinafter described. The plate also has an annular groove or ball-race to receive antifriction balls 23 on which the collar 19 rests. Adjacent the ball-race the top of the plate has an inclined groove 24 for shedding water to prevent it from running into the ball-race, which is undesirable especially in cold weather by reason of the balls being liable to become frozen in. The step-bearing is formed with a threaded stem 25 whereby it is secured to the hinge-post by screwing said stem thereinto up to a shoulder 26 formed on the stem.

The top of the gate is connected to the hinge-post by a loop 27 secured to said post. The loop is in two pieces which are held together by bolts 28 to enable the gate to be readily put up or taken down. The hinge-bar 11 extends through the loop loose enough to permit the gate to be tilted as heretofore described. The loop is formed with a threaded stem 29 whereby it is secured to the hinge-post by screwing said stem thereinto up to a shoulder 30 formed on the stem.

The means for operating the gate are as follows: To the hinge-bar 11 is rigidly secured by a set-screw 31 or otherwise, a plate 32 having on top an upstanding pin 33. Above this plate is arranged an operating lever comprising an arm 34 having at one end two branches 35 which extend laterally in opposite directions. At the other end of the arm is an enlargement 36 provided with an opening 37 through which the hinge-bar 11 loosely extends. In front of this opening the enlargement has a substantially triangular-shaped opening 38 into which the pin 33 extends. Behind the opening 37 the enlargement 36 has an arc-shaped slot 39, on one side of which, midway between its ends is a recess 40. To the hinge-post 8 is secured a stem 41 having at its outer end an upstanding pin 41ᵃ which extends into the slot 39 and enters the recess 40 when the gate is closed. The parts 32 and 36 are held together by a collar 42 secured to the hinge-bar 11 above the part 36.

In order that the gate may be operated from a distance, ropes or cables 43 are connected to the branches 35 and extended from the gate a suitable distance in opposite directions. The ropes pass over pulleys 44 secured to a cross-bar on the hinge-post 8, and their free ends are supported in any suitable manner so that they may be reached by a person mounted or afoot.

The opening and closing of the gate is effected as follows:—When the gate is closed the arm 34 extends parallel thereto, and the pin 33 engages the apex of the opening 38. The pin 41ª engages the recess 40. To open the gate, the arm 34 is pulled by one of the ropes 43 in the same direction that the gate is to swing. This pull on the arm swings it around on the hinge-bar 11, the recess 40 acting as a fulcrum for the arm, whereby one of the inclined sides of the opening 38 is caused to slide along the pin 33 which tilts the gate rearwardly toward the hinge-post. A further pull on the arm 34 upon the pin 33 reaching the end of the recess 38, as well as the fact that the tilting of the gate throws it off the perpendicular, starts it to swinging in the desired direction until it is stopped by a post or other suitable device located adjacent the gate-way. When the gate stops, the arm 34 assumes the position shown in Fig. 4, the pin 33 then again engaging the apex of the opening 38, and the pin 41ª being at the end of the slot 39. The length of this slot is such that the gate will have swung entirely open when the pin 41ª reaches the end thereof. To close the gate, the arm 34 is pulled by the rope 43 at the farther side of the gate in the direction it swings when it closes. As the arm is loose on the hinge-bar, it can be readily started, when the pin 33 reaches the end of the opening 38, a slight pull on the arm will start the gate to swinging in the direction to close and the parts then again assume the position shown in Fig. 3.

For holding the gate closed, a latch 45 is provided which is carried by the front bar 12 of the gate. The keeper for the latch is secured to the latch-post 7, and comprises a pair of catches 46 which are pivoted at 47 inside a casing 48 and project through a slot in the top thereof. The casing is fastened to the latch-post in any suitable manner. Inside the casing, between the catches is mounted a stop-block 49 to limit the swing of the catches. The casing is open at the bottom from which project finger pieces 50 on the catches to enable them to be operated by hand.

When the gate swings open it tilts rearwardly as already described which movement of the gate withdraws the latch from the catches. When the door swings to close, it assumes its normal erect position which brings the latch into the path of the catches. The latch strikes one of the catches and tilts it and then strikes the other catch which is prevented from swinging in the direction of the movement of the latch by the stop-block 49 whereupon the gate is stopped. In the meantime the first catch swings back so as to extend behind the latch which is now between the two catches and the gate is held closed.

I claim:—

1. The combination with a tilting and swinging gate, and its hinge-post, of a lever loosely mounted on the hinge-bar of the gate and having a triangular-shaped opening and an arc-shaped slot, a pin carried by the hinge-bar entering the aforesaid opening, and a pin carried by the hinge-post extending into the aforesaid slot.

2. The combination with a tilting and swinging gate, and its hinge-post, of a lever loosely mounted on the hinge-bar of the gate, and having a triangular-shaped opening and an arc-shaped slot provided with a recess in one of its sides, a pin carried by the hinge-bar entering the aforesaid opening, and a pin carried by the hinge-post extending into the aforesaid slot and entering the recess when the gate is closed.

In testimony whereof I affix my signature in presence of two witnesses.

OSCAR VAN TASSELL.

Witnesses:
J. VAN FLEET,
E. A. VAN TASSELL.